United States Patent [19]

Flum

[11] Patent Number: 4,930,643
[45] Date of Patent: Jun. 5, 1990

[54] DISPLAY UNIT WITH MODULAR CAPABILITY

[75] Inventor: Paul L. Flum, Ladue, Mo.

[73] Assignee: Paul Flum Ideas, Inc., St. Louis, Mo.

[21] Appl. No.: 115,718

[22] Filed: Nov. 2, 1987

[51] Int. Cl.$^5$ ............................................. A47F 43/00
[52] U.S. Cl. ..................................... 211/188; 211/194
[58] Field of Search ................ 211/188, 194, 55, 128; 312/107, 108, 111

[56] References Cited

U.S. PATENT DOCUMENTS

| | | | |
|---|---|---|---|
| 2,944,780 | 7/1960 | Monk | 211/188 X |
| 3,272,582 | 9/1966 | Anderson et al. | 211/188 X |
| 3,908,830 | 9/1975 | Skryelowski | 211/55 |
| 3,964,810 | 6/1976 | Murphy | 211/188 X |
| 4,453,640 | 6/1984 | Cillario | 211/133 |
| 4,467,927 | 8/1984 | Nathan | 211/188 X |
| 4,621,740 | 11/1986 | Lang | 211/194 X |
| 4,628,625 | 12/1986 | Hepp | 211/194 X |
| 4,633,788 | 1/1987 | Robertson | 211/189 X |
| 4,729,485 | 3/1988 | Kulbersh | 211/184 |

Primary Examiner—David M. Purol
Assistant Examiner—Sarah A. Lechor
Attorney, Agent, or Firm—Haverstock, Garrett & Roberts

[57] ABSTRACT

A display unit capable of being both vertically and horizontally arranged to achieve a wide variety of modular configurations comprising a plurality of substantially similar shelf members, a plurality of elongated support members, a plurality of socket cavities associated with the upper and lower portions of each of the shelf members for cooperatively engaging and supporting the elongated support members in a substantially upright position relative to each shelf member, and a plurality of connector members for joining two of the shelf members in side-by-side relationship one adjacent the other, each of the connector members having a pair of socket cavities associated with one end portion thereof for cooperatively engaging any one of the plurality of socket cavities associated with the upper and lower shelf portions and a single socket cavity associated with the opposite end portion thereof for cooperatively engaging one end portion of each of the elongated support members, the elongated support members and the connector members being positioned and engaged with each other and with the respective upper and lower socket cavities associated with adjacent shelf members to connect such shelf members in spaced apart relationship one above the other and/or in side-by-side relationship one adjacent the other. Each of the elongated support members includes side wall portions which are concavely biased to improve the joinder between each support member and each such shelf cavity.

24 Claims, 6 Drawing Sheets

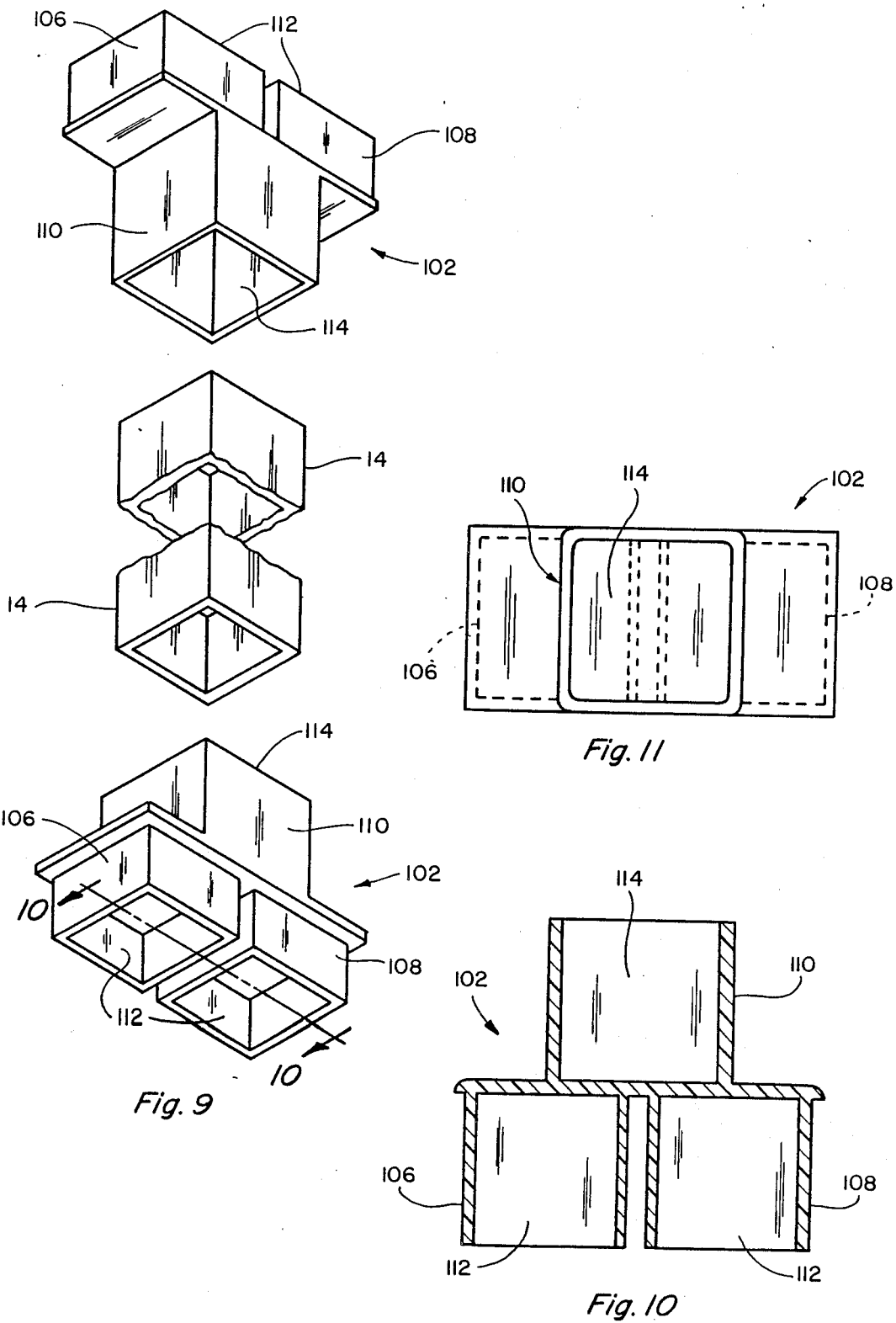

DISPLAY UNIT WITH MODULAR CAPABILITY

The present invention relates generally to product display devices for use in storing and merchandising shelved products and, more particularly, to a display unit construction which can be both stackably arranged to achieve any desired number of vertically disposed shelf members and horizontally arranged to achieve any side-by-side modular configuration. The present display unit includes improved means for cooperatively engaging the upright support members of the present unit with the socket means located on each respective shelf member for improving the overall stability and rigidity of the assembled unit. A side panel display unit attachable to one or both sides of the present unit is also disclosed. The present display unit is adaptable for use in many display shelf and point-of-purchase applications and can be utilized for displaying and merchandising a wide variety of products such as soft drink products and other types of packaged and/or canned products. Also, because of its modular capability, the present display unit has utility in furniture applications and can be utilized as pool-side furniture, modular shelving for use in association with radio, television, stereo and VCR equipment, and other furniture and wall systems applications.

BACKGROUND OF THE INVENTION

Display units for storing and merchandising a multiplicity of products having shelves which are vertically stackably arranged in spaced relationship one above the other are well known in the art. Such known display units teach a wide variety of means for attaching the upright support members associated with such units between adjacent vertically arranged shelf members. Such known connection means include a wide variety of wedge-type connections employed between the various shelf members and the upright support members associated therewith as shown, for example, in U.S. Pat. Nos. 3,343,685; 3,424,111; 4,574,709; 4,593,826; and 4,621,740. Still other means for vertically stacking one shelf member or display module upon the other is shown in U.S. Pat. No. 4,618,115. Although the known constructions have attempted to provide a connection between the shelf members and the upright support members positioned therebetween which is durable, less susceptible to wear, and more stable, such prior art constructions still suffer from certain disadvantages and shortcomings. For example, all of the features associated with the known prior art constructions have made such units overly complex, expensive to manufacture, difficult and cumbersome to assemble and transport from one location to another, they require a large number of parts and/or components to assemble which is both inconvenient and time consuming, and such units are still subject to considerable racking when assembled. This is not true of the present display construction as will be hereinafter explained. The present display unit as well as the improved connection means for vertically stacking the associated shelf members in spaced relationship one above the other is clearly different from and distinguishable over the above known prior art constructions.

There also exists a need and demand for an economical display unit which not only permits the spaced apart vertical stacking of one shelf member above the other, but also has modular capability in that it permits adjacent units to be arranged in side-by-side relationship in any desired modular configuration. Typical of the known modular-type display units presently in use in a wide variety of wholesale and retail outlets is the modular unit shown in U.S. Pat. No. 4,673,090. Such known modular-type units are limited to certain defined configurations only and do not provide maximum flexibility to a merchant in the areas of conserving and efficiently utilizing available floor space, minimizing assembly time, and maximizing the storage and display of saleable goods on such assemblies. This is not true of the present display unit as will be hereinafter explained wherein such shelf members may be attached in side-by-side relationship to each other so as to achieve a wide variety of both vertical and horizontal modular configurations. None of the known prior art devices provide a unit which can be both vertically and horizontally arranged to achieve any desired arrangement and none discloses a display unit having improved means for attaching the shelf members to one another and to the upright support members associated therewith as is true of the present construction. The present display unit is durable, easily movable from one location to another, employs a minimum of parts to reduce manufacturing costs, greatly simplifies installation, and requires no tools or other means for assembly.

SUMMARY OF THE INVENTION

The present display unit overcomes many of the disadvantages and shortcomings associated with the known constructions and teaches the construction and operation of a relatively simple, modular-type display unit which includes a plurality of similar shelf members and a plurality of elongated support members, the elongated support members being preferably tubular in construction and each having opposite end portions cooperatively engageable with socket means located on both the upper and lower portions of each respective shelf member. The socket means associated with the upper portion of each shelf member are located at approximately the respective corners of each such member and each includes a cavity adapted to receive a correspondingly shaped end portion associated with each support member to fixedly maintain the support members in an upright substantially vertical position relative to such shelf member. The socket means are also positioned outside of the merchandise placement or storage area associated with each shelf member and this allows for more visibility, accessibility and packout of the particular products merchandised therefrom. Each elongated support member is preferably square in shape and each includes resilient side wall portions that are concavely bowed and biased to the extent that such bowed side walls have to be squeezed or compressed inwardly in order to be inserted into any one of the respective socket cavities. The bias or spring tension associated with the bowed side walls of each of the elongated support members, when squeezed or compressed into the respective socket cavities, makes for an extremely tight compression fit and provides a most rigid and secure connection therebetween. This particular joinder means eliminates movement of the support members within the socket cavities and substantially minimizes any racking effect due to the vertical stacking of a plurality of such shelf members. This joinder method is important to the present invention because it represents a simple but yet extremely effective means for obtaining a tight, rigid connection between the upright support members and the shelf socket means without utilizing other structural means in association with such joinder as is true of the known prior art. Since structural integrity and stability is most important in any type of stackable display fixture, the present connection means produces a substantially more stable and rigid connection as compared to other connection means utilized in low cost display units, and does so without requiring the use of any tools or other mechanical means for achieving the same.

Each of the upper shelf socket cavities may also optionally include means in the form of a plurality of projections positioned and arranged within each such cavity so as to extend into and engage the respective end portion of the support member positioned therewithin to provide additional resistance to any horizontal force applied to the assembled unit thereby further preventing movement of the support members within their respective socket cavities.

Similarly, the underside portion of each respective shelf member includes socket means located at approximately the respective corners of each such shelf member in axial alignment with the socket means located on the upper shelf portion. Like the upper shelf sockets, each of the lower shelf sockets includes a cavity adapted to receive one end portion of each of the respective support members. The elongated support members, when properly positioned and engaged with the socket means associated with one such shelf member, enables another shelf member to be vertically stackably arranged thereupon in position to receive another plurality of support members, if so desired. This stacking process may be continued to achieve any desired number of vertically disposed shelf members and/or any desired display height.

The modular capability of the present display unit is achieved through the use of a substantially Y-shaped connector means having a double socket arrangement associated with one end portion thereof and a single socket arrangement associated with the opposite end portion thereof. Each of the sockets associated with such Y-shaped connector includes a cavity, the cavity associated with the single socket portion being correspondingly shaped and dimensioned to receive either end portion of the respective support members whereas each of the cavities associated with the double socket portion is correspondingly shaped and dimensioned to be inserted into any one of the socket means located on either the upper or lower portion of each respective shelf member. Proper use and arrangement of the Y-shaped connector means in association with the shelf members and support members of the present display unit enables a plurality of such units to be easily joined together in a multiplicity of side-by-side modular arrangements, including various L-shaped arrangements, to form a unitized system. This provides greater flexibility in using and orienting the present display unit in any particular merchandising area and allows a user to modularly arrange such units accordingly. Use of the Y-shaped connectors also requires use of only one vertical support member (instead of two) between adjacent units. The lower portion of the present unit can likewise be equipped with casters or other rolling means for easily transporting and/or relocating the present unit from one merchandising area to another.

The present invention further includes an optional side panel display unit which may be attached to one or both opposite sides of the present unit by and between the upright support members, the side panel display unit being shaped and constructed to hold and merchandise additional goods to the buying public. This optional unit greatly increases the product holding capacity of the entire unit and is ideally suited for cross-merchandising other types of products to the consumer in addition to the principal products stored and displayed on such unit. A typical cross-merchandising product for which the side panel display unit could be utilized would include holding and displaying video tapes and cassettes for sale and/or rental to the general public, although a wide variety of other products may likewise be stored and displayed on such side panel units.

All of the features and capabilities afforded by the present display unit are particularly important to merchants because they maximize the utilization of available floor space, they provide a merchant with a greater range of possibilities for maximizing adjacent positioning of a plurality of such units through modular arrangement, and they enable a merchant to display and merchandise more goods to the general public including cross-merchandising goods through the use of the present side panel display units.

It is therefore a principal object of the present invention to provide an efficient and stable modular type display unit.

Another object is to provide improved means for vertically stackably arranging a plurality of shelf members in spaced relationship one above the other.

Another object is to provide a display unit having means associated therewith for modularly arranging and connecting such units in a wide variety of adjacent side-by-side and right angle configurations.

Another object is to provide a display unit which maximizes adjacent positioning of a plurality of such units.

Another object is to provide a display unit which reduces the time required to place such units in a usable condition for accommodating the display and merchandising of goods therefrom.

Another object is to provide a display unit which is structurally and operationally simple and easy to install and to configure into a wide variety of operational modes without the use of tools or other means for assembling the same.

Another object is to provide a modular type display unit which is relatively more stable, durable and able to withstand moderate impact without collapsing and disassembling.

Another object is to provide a display unit which affords a user a plurality of different options when determining how best to configure such unit.

Another object is to provide a display unit which affords a user the opportunity to cross-merchandise a wide variety of goods therefrom.

Another object is to provide a modular type unit which has utility in furniture and wall systems applications, including outdoor applications, and which modular unit could be made from a hi-impact shatterproof type material such as plastic that is resistant to rust and other deterioration due to climate.

These and other objects and advantages of the present invention will become apparent to those skilled in the art after considering the following detailed specification in conjunction with the accompanying drawings wherein:

BRIEF DESCRIPTION OF THE DRAWINGS

FIG. 9 is a partially exploded perspective view showing how the present Y-shaped connector means are arranged in mating relationship with an upright support member to achieve a modular arrangement;

FIG. 10 is a cross-sectional view of one of the present Y-shaped connector means taken along line 10—10 in FIG. 9;

FIG. 11 is a top plan view of the Y-shaped connector means of FIG. 10;

DETAILED DESCRIPTION OF THE INVENTION

Figure 1:
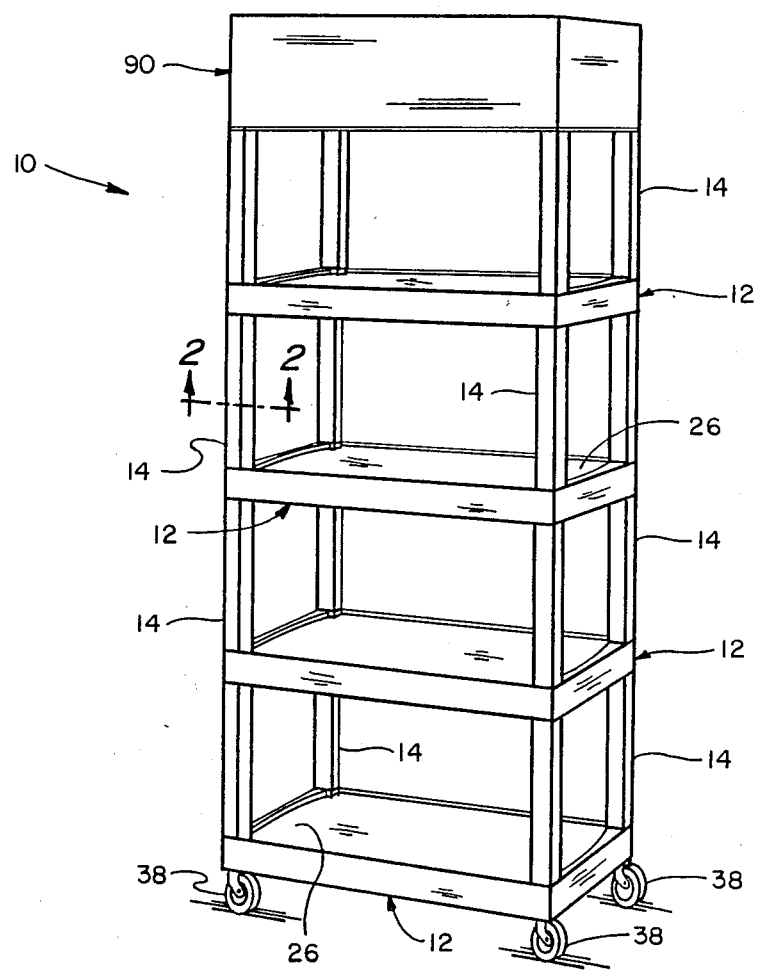
FIG. 1 is a perspective view of a display unit constructed according to the teachings of the present invention.
Figure 3:
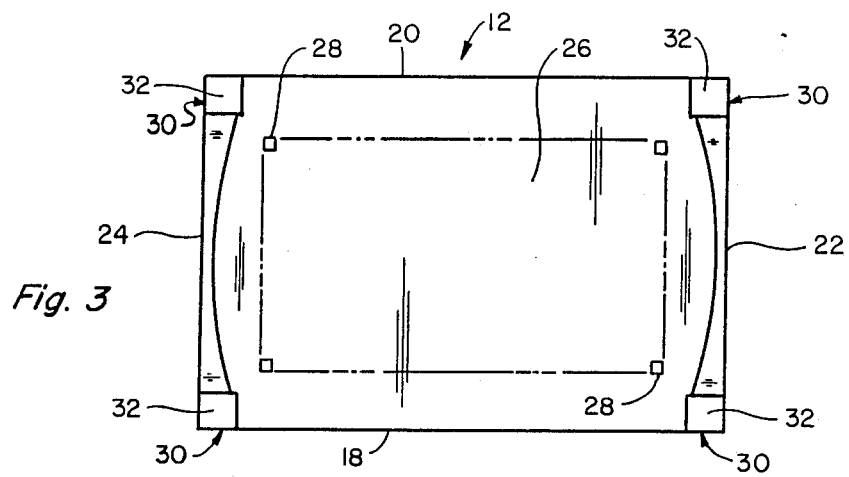
FIG. 3 is a top plan view of one of the shelf members of FIG. 1.
Figure 4:
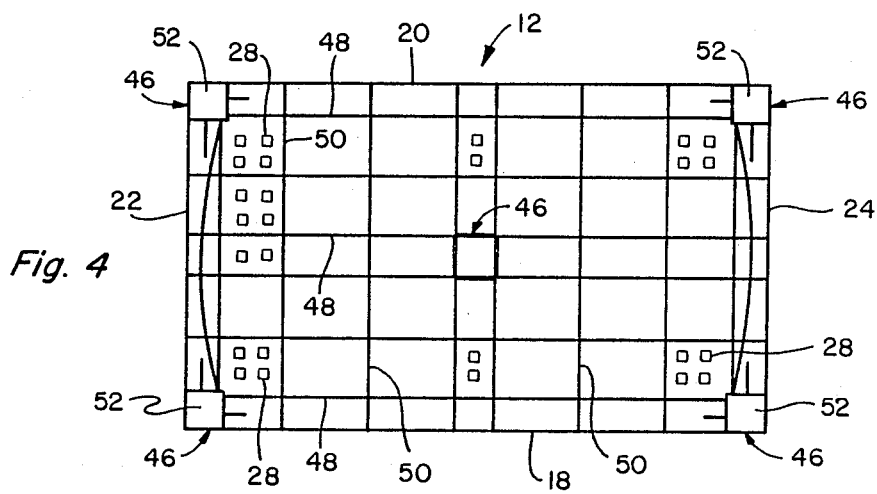
FIG. 4 is a bottom view of the shelf member of FIG. 3.

Referring to the drawings more particularly by reference numbers, wherein like numerals refer to like parts, number 10 in FIG. 1 identifies a display unit constructed according to the teachings of the present invention. The display unit 10 includes a plurality of substantially similar shelf members 12 and a plurality of elongated support members 14 positioned between the spaced apart shelf members 12 for vertically stacking the same one above the other as shown in FIG. 1. Each of the shelf members 12 is designed to support and merchandise products positioned thereon such as bottled and canned soft drink products and the like, and each shelf 12 includes spaced front and rear wall portions 18 and 20, spaced side wall portions 22 and 24 and a floor portion 26 which extends substantially the full length and width of the member 12 between the front, rear and side wall portions as shown in FIG. 3. Each shelf member 12 is generally rectangular in shape and each may optionally include a plurality of perforations 28 distributed over the floor portion 26 as best shown in FIGS. 3 and 4. Although the perforations 28 are illustrated as being uniformly arranged in parallel rows and columns over substantially the entire extent of the floor portion 26, it is recognized that any arrangement of such perforations may be utilized. It is also recognized that the shelf members 12 may be fashioned into a variety of different sizes and shapes, for example, square, circular, hexagonal, or some other configuration, without impairing the teachings of the present invention so long as such members are capable of being stackably arranged in spaced apart relationship one above the other as will be hereinafter explained. A wide variety of different header assemblies such as the header assembly 90 (FIG. 1) may likewise be used in conjunction with the present display unit 10 to attractively advertise and focus attention upon the specific products on display within the unit.

Socket means such as the sockets 30 are each respectively positioned and located at approximately the respective corners of each shelf member 12 as best shown in FIG. 3. Each socket means 30 includes a counterbore or cavity 32 adapted to receive and engage a correspondingly shaped end portion associated with the upright support members 14. Each cavity 32 is shown as being substantially square in shape and each includes side wall portions 34A, 34B, 34C and 34D (FIG. 3A) which form a locating surface for positioning and locating the opposed end portions of the respective support members 14 within each such cavity. The sockets 30 are dimensioned such that the respective cavities 32 cooperatively or telescopingly receive and engage either end portion of each of the upright support members 14 as will be hereinafter explained so as to fixedly maintain such support members in an upright substantially vertical position relative to the shelf floor portion 26 as shown in FIG. 1. This socket arrangement also ensures that the support members 14, when engaged with the cavities 32, will be positioned outside of the product support area associated with each shelf floor portion 26 so as not to interfere with the visibility, accessibility and packout of the particular products positioned thereon.

Figure 2:
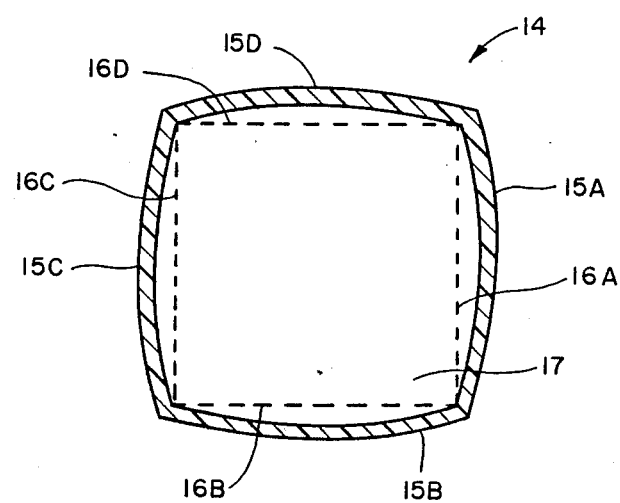
FIG. 2 is a cross-sectional view taken along line 2—2 in FIG. 1 showing the bowed side wall configuration associated with the vertical support members.

Each of the elongated support member 14 is preferably tubular in shape and each is shown as being substantially square in shape so as to correspond to the shape of the respective socket cavities 32. Each support member 14 includes resilient side wall portions 15A, 15B, 15C and 15D, which side walls are concavely bowed and biased outwardly as shown in FIG. 2. The dotted outline portions 16A-16D illustrated in FIG. 2 represent the position and location of such side walls if each support member 14 was constructed so as to be exactly square in cross-sectional shape. Since the respective cavities 32 are dimensioned to receive a square-shaped end portion associated with each upright support member 14 such as a support member having side walls positioned as represented by the dotted outline portions 16A-16D in FIG. 2, the space 17 formed by and between the bowed side walls 15A-15D is slightly greater than the cavity space formed by and between the cavity side walls 34A-34D. This means that the concavely biased side walls 15A-15D must be squeezed or compressed inwardly in order to be inserted into the corresponding socket cavities 32. This is an important feature of the present invention since the spring tension or elasticity associated with the bowed side walls of each of the support members 14, when squeezed into the respective cavities 32, makes for an extremely tight compression fit between the members 14 and 30. This is true because when the compression force against the respective bowed side walls 15A-15D is released, the resiliency of such side walls allows the side walls 15A-15D to recover to their former bowed state thereby frictionally wedging the side walls 15A-15D against the side walls 34A-34D of the respective socket cavities 32 thereby providing a more stable and rigid connection therebetween. Since structural integrity is perhaps the most important and vital factor in display fixtures that are stackably arranged one upon the other to achieve any desired number of vertically disposed shelf members, the rigidity of the side walls of the respective socket cavities 32 in combination with the spring tension or bias of the bowed side walls of the support members 14 produces a most secure and rigid type of connection between the support members 14 and the sockets 30, a connection which is substantially superior to other known means that have been utilized in low cost stackable display units. This connection arrangement eliminates the need for other bracing means associated with either the opposite end portions of the respective support members or within the respective socket cavities to achieve a tight and secure connection therebetween. It is important to recognize that the amount of bowness or resiliency associated with the respective side walls 15A-15D will determine, within reason, the tightness of the connection between the support members 14 and the sockets 30. Since the support members 14 are preferably made of a plastic material as will be hereinafter discussed, the present connection means utilizes the resulting spring tension or elasticity of the plastic material to achieve the necessary structural rigidity between the members 12 and 14.

Figure 3A:
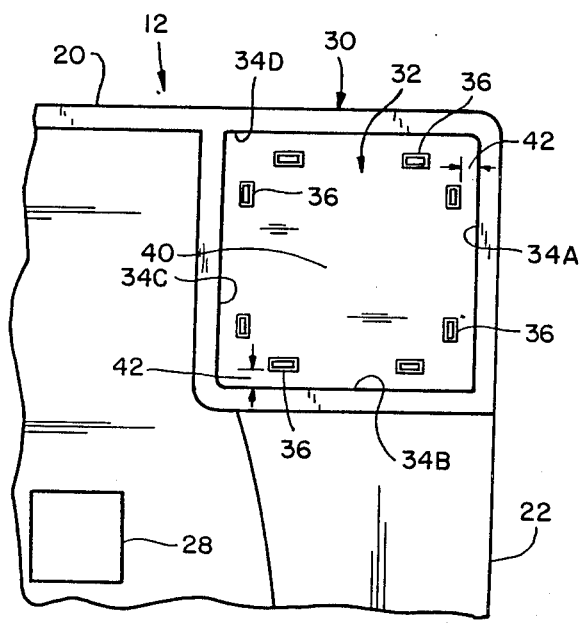
FIG. 3A is an enlarged partial view of one corner of the shelf member of FIG. 3 showing the optional projection means associated with one of the upper socket means.

Each cavity 32 may also optionally include a plurality of projection members 36 which are positioned and arranged so as to extend upwardly from the cavity bottom wall portion 40 as best shown in FIG. 3A. The projections 36 are cleat-like members arranged about the periphery of the cavity bottom wall 40 in spaced apart relationship both from each other and from the respective adjacent cavity side walls 34A-34D so as to form a peripheral segmented channel or groove 42 therearound. The upright support members 14 are preferably tubular in shape as previously explained and the projections 36 are positioned such that the transverse dimension of the segmented channel 40 corresponds to the wall thickness of the correspondingly shaped tubular end portions associated with each support member 14. This means that the respective wall portions forming the tubular end portion of the support member 14 engageable with each socket 30 will be also frictionally received within the segmented channel 42 and will be bounded on one side by the respective cavity side walls 34A-34D and on the opposite side by the plurality of projections 36. The projections 36 therefore further restrict movement of the support member 14 within the socket cavity 32 and further stabilize the connection therebetween thereby substantially minimizing racking and providing a still more rigid connection between the support members 14 and the shelf members 12. Use of the projection members 36 also provides additional resistance to any horizontal force applied to the assembled unit and provides further support and stability to the upright support members 14 at the base or root of each cavity 32.

It is important to note that use of the projection members 36 is not necessary when the support member side walls 15A-15D are sufficiently bowed as the spring tension associated with such bowed side walls provides a most secure and rigid type of connection in and of itself. However, use of the projection members 36 is most advantageous for obtaining a tight, rigid connection between the shelf sockets 30 and the support members 14 when the side walls of the support members 14 are not bowed in any manner. This projection arrangement therefore provides another means over and above the bowed side wall construction associated with the support members 14 for obtaining a tight, rigid connection between the members 14 and the shelf sockets 30.

Although each of the socket means 30 are shown as being substantially square in shape with a substantially square cavity 32 associated therewith, it is recognized that both the size and shape of the sockets 30 as well as their respective associated cavities 32 may be fashioned into a variety of different sizes and shapes, for example, triangular, hexagonal, or some other configuration, without impairing the teachings of the present invention so long as the cavities 32 are adapted to receive and hold the respective concavely biased side wall end portions associated with the support members 14. Also, if the optional projections 36, are used, such projections should be correspondingly shaped and positioned to define a segmented channel similar to the channel 42 around the periphery of the cavity opening 32. Regardless of their size and/or shape, the cavities 32 should be of sufficient depth so as to provide stable and rigid stacking of the present shelf members 12 one above the other depending upon the particular load carrying capacity desired.

The underside portion of each of the shelf members 12 includes a plurality of socket means 46 and a support gridwork arrangement as best shown in FIG. 4. The gridwork structure on the bottom portion of the shelf 12 includes a plurality of downwardly extending wall members or ribs 48 which extend substantially the entire distance between the side wall portions 22 and 24, and a plurality of downwardly extending wall members or ribs 50 which are located perpendicular to the rib members 48 and serve as cross-structure in conjunction therewith. The position and location of the rib members 48 and 50 provide added support, stability and rigidity to the shelf member 12 as well as to the overall display unit 10, particularly when a plurality of such shelf members 12 are vertically stackably arranged one upon the other. It is recognized that both the location and number of the rib members 48 and 50 may vary depending upon a particular application. It is also anticipated that additional reinforcing members may likewise be utilized to add still further support and stability to both the individual shelf members 12 and the overall unit 10.

Figure 4A:
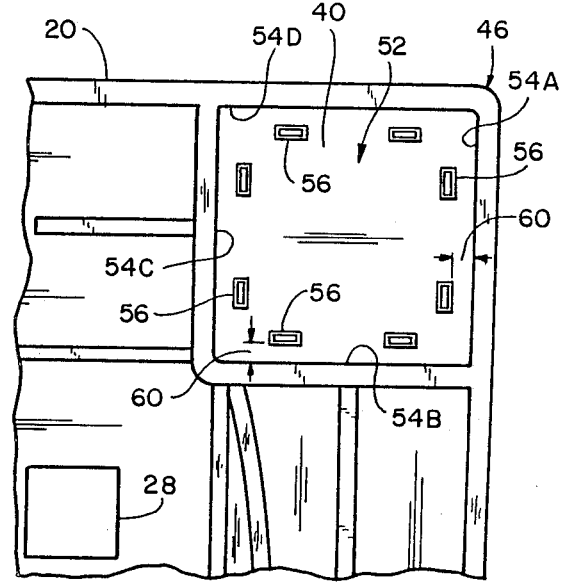
FIG. 4A is an enlarged partial view of one corner of the shelf member of FIG. 4 showing the optional projection means associated with one of the lower socket means.
Figure 5:
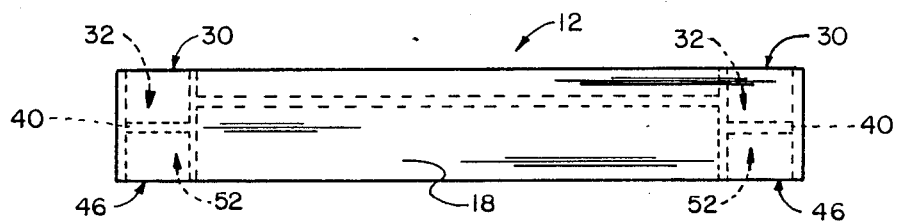
FIG. 5 is a side elevational view of one of the shelf members of FIG. 1.

Like the upper socket means 30, the lower socket means 46 are located at approximately the respective corners of each shelf member 12 and such sockets are positioned in axial alignment with the upper socket means 30 as shown in FIG. 5. Similarly, each socket means 46 includes a cavity 52 adapted for receiving and engaging a correspondingly shaped end portion associated with the support members 14, each cavity 52 including side wall portions 54A, 54B, 54C and 54D (FIG. 4A) which form a locating surface for positioning and locating the opposed end portions of the respective support members 14 within each such cavity 52. As best shown in FIG. 5, the cavities 32 and 52 are preferably not sufficiently axially elongated so as to meet, but instead, the intermediate wall 40 extends therebetween serving as a common bottom/top wall for each cavity 32 and 52. The intermediate wall 40 forms a bearing surface for engaging the respective end portions of the support members 14 when such members are insertably positioned within the respective cavities 32 and 52 and its thickness can be varied depending upon the weight capacity of the particular goods to be stackably arranged upon the individual shelf members 12. The bowed side walls 15A-15D of each support member 14 are frictionally engageable in a compression fit with the side walls associated with any one of the respective socket cavities 32 and 52.

Each cavity 52 may also optionally include a plurality of projection members 56 positioned and arranged within each such cavity so as to extend downwardly from the cavity top wall 40 as best shown in FIG. 4A. The projections 56 are also cleat-like members arranged about the periphery of the cavity wall 40 in spaced apart relationship similar to the arrangement of the optional projections 36 associated with the cavities 32. The projections 56 form a peripheral segmented channel or groove 60 adjacent the cavity side wall portions 54A-54D similar to the segmented channel 42 associated with the socket means 30, the channel 60 being dimensioned similar to the channel 42 so as to also frictionally receive and engage the correspondingly shaped tubular end portions associated with the support members 14. Like the projections 36, the projections 56 provide another means for further restricting movement of the support members 14 within the socket cavities 52, especially if the side walls of the support members 14 are not bowed outwardly as previously explained.

The bowed side wall construction associated with each of the support members 14, which side walls must be squeezed together or compressed before insertion into the somewhat smaller socket cavities 32 and 52, provides improved means for cooperatively engaging the upright support members 14 with the respective socket means 30 and 46 thereby substantially improving the overall stability and rigidity of the entire unit. Likewise, the position and arrangement of the optional projection members 36 and 56 associated with each of the socket means 30 and 46 provides still further means to prevent movement of the support members 14 within the respective socket cavities 32 and 52.

The underside portion of the shelf member 12 also includes an optional socket means 46 located at the approximate center of the member 12 as best shown in FIG. 4. This centrally located socket 46 is constructed substantially identical in all respects to the sockets 46 previously described and is provided so as to provide additional support to the shelf member 12 when exceptionally heavy items are positioned thereupon. This additional support can be provided by engaging one end portion of a support member 14 with the centrally located socket means 46 and allowing the opposite end portion of such support member to rest upon and be supported by the floor portion 26 associated with the shelf member 12 positioned immediately therebelow.

Figure 6:
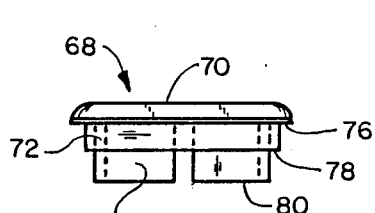
FIG. 6 is a side elevational view of a cap member which may be used in conjunction with the display unit of FIG. 1.
Figure 7:
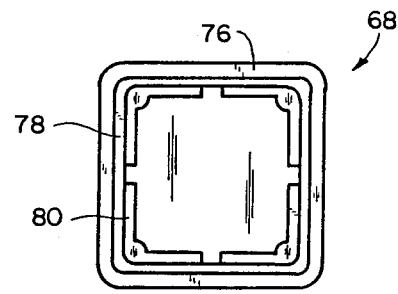
FIG. 7 is a bottom view of the cap member of FIG. 6.

FIGS. 6 and 7 illustrate a cap member 68 which is specifically designed and constructed to cooperatively engage either the socket means 30 or the respective opposite end portions of the support members 14. The cap member 68 is substantially square in construction so as to conform to the overall shape of both the socket means 30 and the support members 14 and includes a substantially flat top planar portion 70 having a plurality of substantially square concentric wall portions 72 and 74 extending downwardly therefrom as best shown in FIG. 6. The wall members 72 and 74 are dimensioned and arranged upon the top portion 70 such that three distinct vertically spaced concentric surface portions 76, 78 and 80 are defined as shown in FIGS. 6 and 7. The wall portion 74 is dimensioned so as to be telescopingly receivable within either end portion of the support members 14 such that either terminal end surface of such support members will mate with and abut the surface 78 of the cap member 68. Similarly, the wall portion 72 is positioned and arranged so as to be telescopingly receivable within the respective socket cavities 32 such that the terminal end surface of such sockets will abut with and engage the surface 76 of the cap member 68. The cap member 68 can be used to cover up any exposed socket means 30 associated with the upper shelf member 12 of a particular display arrangement or the exposed end of a support member 14, if so arranged, to present a more visually attractive appearance to the general public. It is also recognized that the size and shape of the cap member 68 may be fashioned into a variety of different sizes and shapes depending upon the configuration of the support members 14 and the socket means 30 without impairing the teachings of the present invention so long as the concentric wall portions 72 and 74 are adapted to telescopingly engage the opposite end portions of the support members 14 and 16 and the socket means 30.

The present unit 10 may optionally include rolling means such as the casters or rollers 38 (FIG. 1) for easily moving the entire unit 10 from one location to another. The casters 38 are fabricated so as to engage the lower shelf socket means 46 and facilitate transporting and/or relocating the present unit from one merchandising area to another. The rollers or casters 38 can be utilized with any modular arrangement of the present unit 10.

Figure 8:
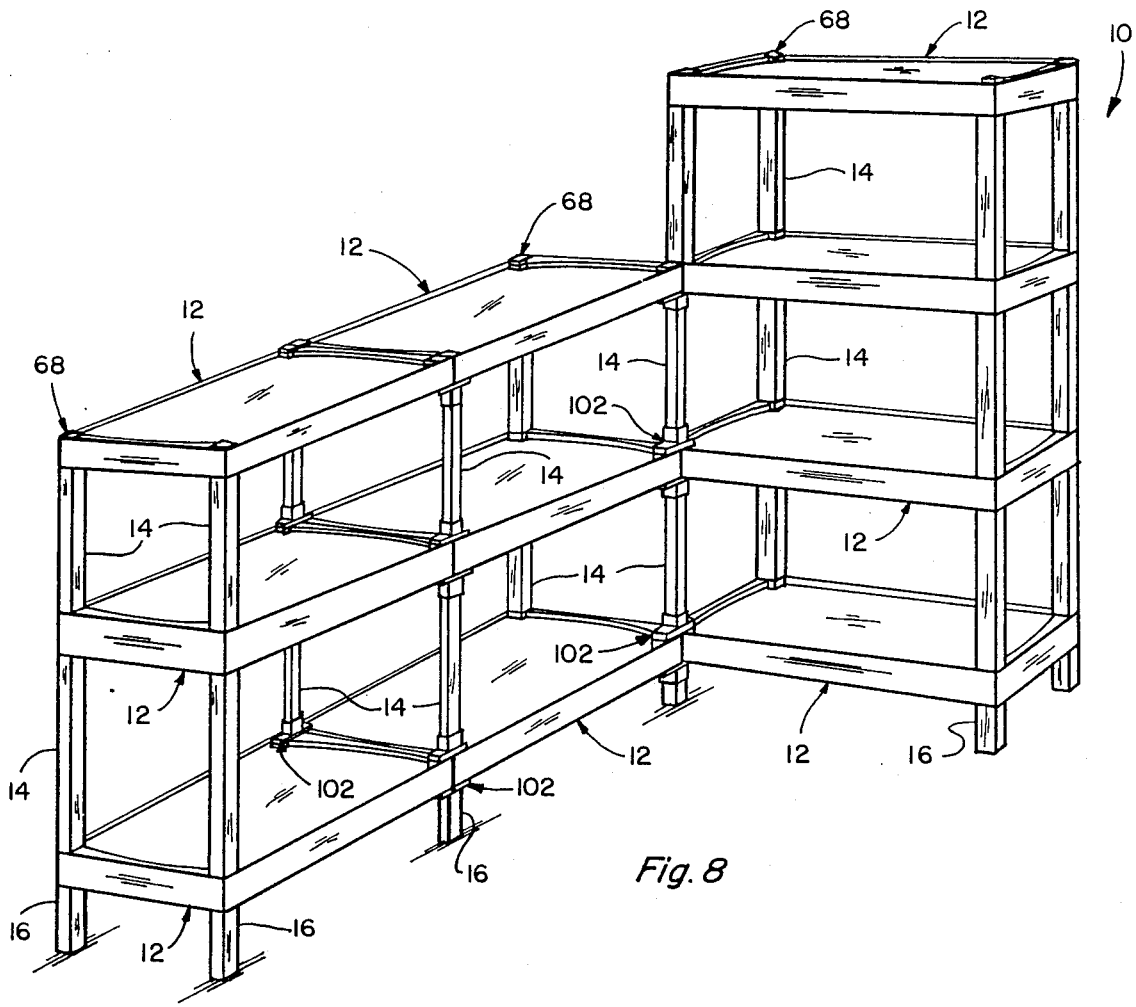
FIG. 8 is a perspective view of a plurality of the present display units arranged in modular configuration.

FIG. 8 illustrates one modular arrangement of the present display units 10. The modular capability of the present invention is achieved through the use of connector means 102 illustrated in FIGS. 9-11. Each connector means 102 is substantially Y-shaped in structure and each includes a double socket arrangement such as the socket means 106 and 108 associated with one end portion thereof and a single socket arrangement such as the socket means 110 associated with the opposite end portion thereof. The socket means 106 and 108 are identical in structure and each includes a cavity 112 which is correspondingly shaped and dimensioned to cooperatively engage any one of the socket means 30 and 46 located on both the upper and lower surfaces respectively of each shelf member 12. The socket means 106 and 108 are insertably receivable within the respective shelf socket means 30 and 46 and form a tight frictional fit therewith. In addition, if the optional projection members 36 and 56 are positioned and arranged within the respective socket cavities 32 and 52 as previously explained, the side wall portions associated respectively with each socket means 106 and 108 are specifically dimensioned so as to cooperatively engage such optional projections 36 and 56 in the same manner as hereinbefore described. The socket means 106 and 108 associated with connector means 102 are dimensioned depthwise so as to correspond to the depth of the socket cavities 32 and 52.

Figure 12:
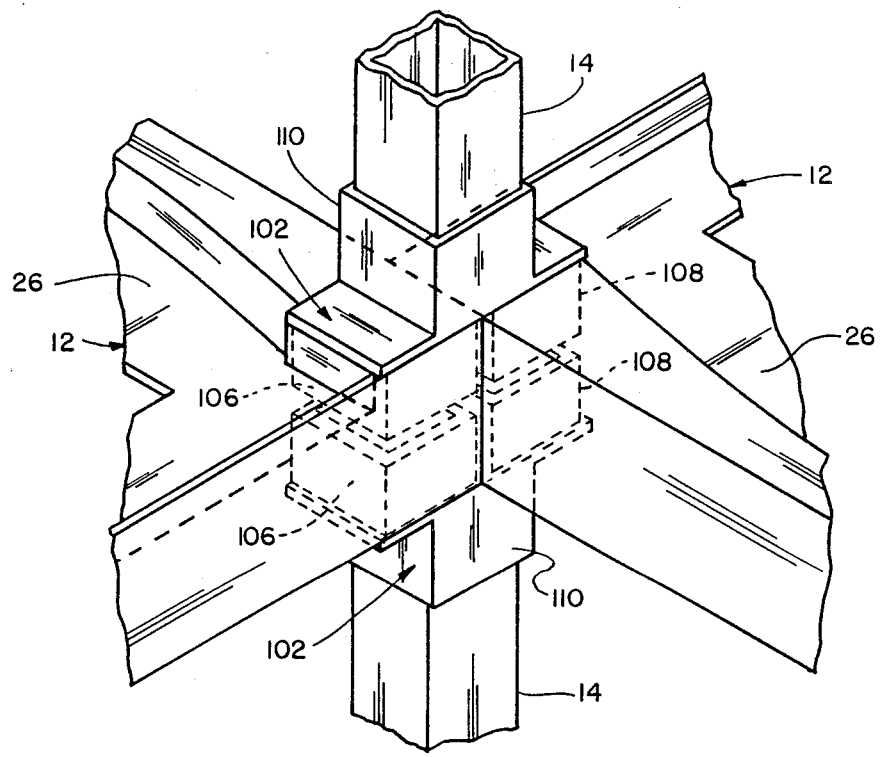
FIG. 12 is a partial perspective view showing engagement of the present Y-shaped connector means of FIGS. 9-11 with the upper and lower socket means associated with one of the shelf members shown in FIG. 8.

Similarly, the single socket means 110 associate with each of the Y-shaped connectors 102 includes a cavity 114 which is correspondingly shaped and dimensioned so as to telescopingly receive either end portion of the respective support members 14 as best shown in FIGS. 8, 9 and 12. The socket means 110 are substantially identical in construction to the socket means 30 and are similarly adapted to receive the bowed side walls 15A-15D of the support members 14 when such side walls are squeezed or compressed inwardly prior to insertion into the socket means 110. Like the socket means 30, each socket means 110 may likewise include a plurality of optional projections (not shown) positioned and arranged within each such cavity 114 similar to the projections 36 so as to likewise provide additional support and stability to the support member 14 engaged therewith as previously explained. Each socket means 110 functions in substantially the same manner as the socket means 30 to provide support and stability to the upright support member engaged therewith.

FIGS. 8 and 12 illustrate how the present connector means 102 can be utilized in conjunction with the shelf members 12 to achieve a modular arrangement. As is apparent from FIGS. 8 and 12, the connector means 102 can be utilized to achieve any side-by-side modular configuration including various L-shaped arrangements as well as arrangements having portions thereof of varying height so as to accommodate any particular display application. Use of the connector means 102 enables a user to modularly arrange a particular point-of-purchase display based upon the particular floor space available thereby giving the user greater flexibility in conserving and efficiently utilizing any particular merchandising area while at the same time stably connecting all of the various shelf members associated with such display arrangement. FIG. 12 shows in detail how the connector means 102 engage the respective upper and lower socket means associated with two adjacent shelf members 12. Because of its modular capability, the present display unit can likewise be configured so as to be utilized as pool-side furniture, patio furniture, modular shelving for use in holding and storing radio, television, stereo and VCR equipment, and a multitude of other such furniture and wall systems applications. In this capacity, fabricating the present units out of a hi-impact shatterproof type material such as a plastic material is highly advantageous, particularly when the present units are used in an outdoor application such as pool-side or patio furniture, since plastic type materials are highly resistant to rust and other deterioration due to climate conditions.

It should be noted that the modular arrangement of the present units 10 shown in FIG. 8 include a plurality of pedestal leg members 16 engageable with the lower socket means 46 associated with the lowermost shelf members 12. The leg members 16 are substantially identical in construction to the support members 14, including having resilient concavely biased side wall portions, but differ therefrom in length only. Also, the cap member 68 is likewise engageable with the bottom end portion of each of the pedestal legs 16 thereby providing additional support and stability to the overall display unit 10 as well as providing a greater bearing surface for supporting the weight of the entire unit.

Although it is recognized that various acceptable materials of construction are available and could equally be employed to construct and fabricate the various components of the display unit 10, it is usually preferred that such components be constructed from a relatively rigid plastic material able to withstand moderate impact and mishandling without breakage. Plastic materials are also somewhat resilient and elastic and are ideally suited for fabricating the bowed support members since the resulting spring tension of plastics achieves the necessary structural rigidity of the connection between the upright support members and the shelf sockets. It is also recognized that certain metal, metal alloys, fiberglass, or even wood or other materials could be utilized in the practice of this invention but plastics have been found to be preferred. The selection of the materials should take into account the type of products and their containers to be merchandised from such display unit and the environment where such device is to be located. When made from a plastic type material, the various components of the present display unit are suitable for fabrication by either a thermal-forming process or an injection molding process.

It is also important to note that the overall dimensions of the present unit 10 as well as the particular configuration of the shelf members 12, the support members 14, the socket means 30 and 46, and the connector means 102 are subject to wide variations and each of the members associated with the various embodiments of the present display unit may be sized and shaped into a variety of different sizes and configurations to accommodate different display applications, different product sizes and shapes, and to conform with any space limitation without impairing the teachings and practice of the present constructions. Although the present unit has particular utility in a merchandising environment for storing and merchandising a multiplicity of shelved products therefrom, its simplicity, durability, flexibility and versatility greatly increases its usefulness and effectiveness in a wide variety of other applications.

Figure 15:
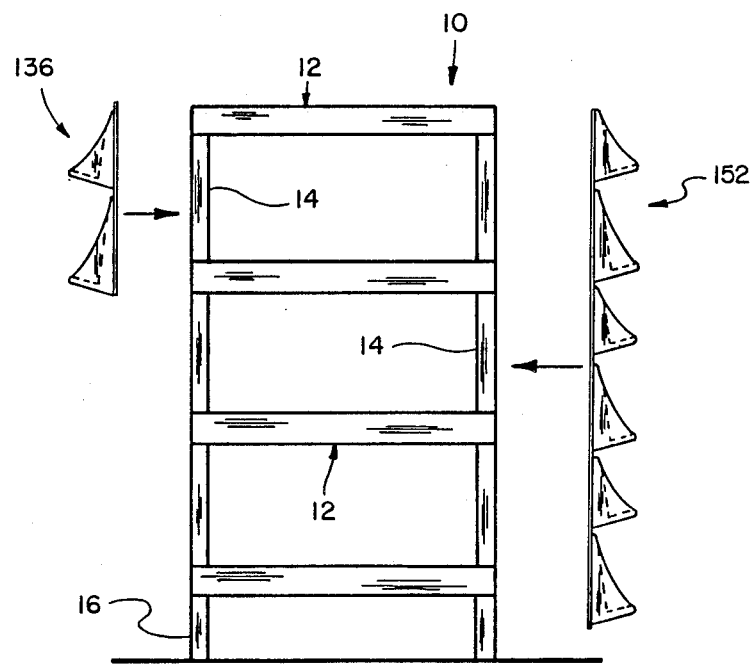
FIG. 15 is an exploded front view of one arrangement of the present display unit showing the construction of several embodiments of the present side panel display unit.
Figure 13:
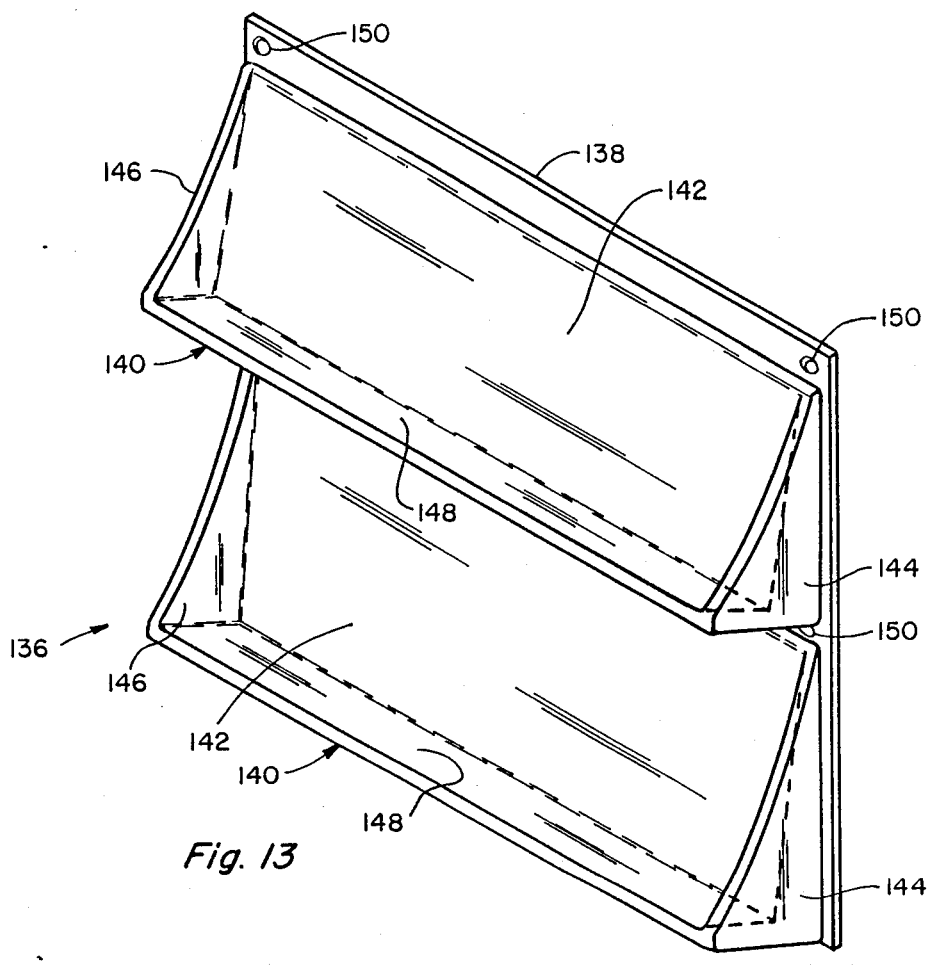
FIG. 13 is a perspective view of an optional side panel display unit which may be utilized in conjunction with the present display unit for displaying and merchandising additional goods therefrom.
Figure 14:
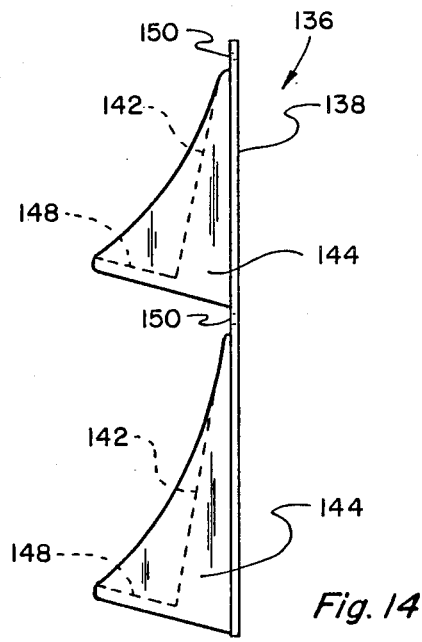
FIG. 14 is a side elevational view of the side panel unit of FIG. 13.

FIGS. 13-15 illustrate an optional side panel display unit 136 which may also be utilized in conjunction with the present unit 10. The side panel unit 136 is shaped and constructed to hold and merchandise additional goods to the buying public and may be easily attached to one or both opposite sides of the unit 10 by and between the adjacent side upright support members 14 as best shown in FIG. 15. The side panel unit 136 includes a backing member 138 and a plurality of vertically spaced shelf members 140 integrally formed therewith or attachable thereto. The shelf members 140 are substantially L-shaped in configuration and each includes a rear wall portion 142, spaced side wall portions 144 and 146, and a floor portion 148 which extends substantially the full length and width of the member 140 between the rear and side wall portions as best shown in FIG. 13. The floor portion 148 is slightly angularly oriented upwardly as shown in FIGS. 13-15 so as to better hold and retain the particular products positioned thereon and prevent the same from falling off of such shelves. The backing member 138 is dimensioned so as to extend completely across the side portion of the unit 10 by and between the respective support members 14 and includes a plurality of apertures 150 as best shown in FIG. 13. The apertures 150 are located adjacent the respective side edges of the unit 136 in positions to register with corresponding apertures (not shown) located on the support members 14 for fixedly attaching the sam to the members 14. Any suitable fastening means (not shown) such as a threaded fastener or an expandable type fastener means may be inserted through the respective apertures for completing the joinder of the side panel unit 136 to the support members 14. It is also anticipated that a sleeve member or suitable clamping members engageable with each support member 14 or the shelf members 12 may also be utilized for attaching the unit 136 to the unit 10.

Any plurality of side panel units 136 may be utilized on any appropriate side of any particular arrangement of the present units 10. Also, the depth of the floor portions 148 may be varied to accommodate any particular goods to be displayed therein. It is recognized that the side panel unit 136 can be made of a one-piece construction and the units 136 may include any plurality of shelf members 140 including a one-piece unit 152 having a backing portion extending the full length of the assembled unit 10 as shown in FIG. 15. Any plurality of units 136 may be arranged and utilized with a particular unit 10 to achieve the particular display arrangement desired. Use of the optional side panel display units 136 greatly increases the product holding capacity of the unit to which they are attached and affords a user a plurality of different options when determining how best to display a wide variety of goods in a limited amount of space. The unit 136 is ideally suited for cross-merchandising other types of products to the consumer without interfering with the display and pack-out of the products displayed in the principal unit to which such side units 136 are attached. A typical cross-merchandising product for which the side panel display units 136 could be utilized would include holding and displaying video tapes and cassettes for sale and/or rental to the general public. A wide variety of cross-merchandising products may be stored and displayed on such side pane units.

Like the other components of the present unit 10, the side panel units 136 are likewise preferably constructed from a relatively rigid plastic material able to withstand moderate impact and mishandling without breakage and such units are likewise suitable for fabrication by either a thermal-forming process or an injection molding process. It is also recognized that other various acceptable materials of construction are available and could be employed to construct the unit 136. It is also anticipated that the unit 136 could be made of an open grid wire construction without impairing the teachings and practice of the present construction. It is likewise anticipated that the present side panel units 136 could be used in conjunction with a multitude of other display units having shelves which are vertically stackably arranged one above the other through the use of elongated support members such as the support members 14 disclosed herein.

Thus, there has been shown and described several embodiments of a display unit construction having modular capability, which display unit fulfills all of the objects and advantages sought therefore. Many changes, modifications, variations, and other uses and applications of the present constructions will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A display unit for accommodating the storage of products thereon comprising a plurality of substantially similar shelf members, each of said shelf members having an upper portion, a lower portion, and a floor portion for positioning products thereon, a plurality of elongated support members having opposed end portions, a plurality of socket cavities associated with the upper portion of each of said shelf members and a plurality of socket cavities associated with the lower portion of each of said shelf members, said plurality of upper and lower socket cavities being positioned at spaced locations on the respective upper and lower portions of said shelf members, each of said socket cavities including side wall portions forming a locating surface for cooperatively positioning and locating the opposed end portions of said support members within each such socket cavity, each of said elongated support members including concavely biased resilient side wall portions, the concavely biased side wall portions of each of said support members being able to flex inwardly away from their normal unstressed biased condition so as to be receiveably engageable in a compression fit with the side wall portions of each of said upper and lower socket cavities, the side wall portions of said support members having sufficient elasticity to move outwardly back towards their normal unstressed concavely biased condition once positioned within said sockets cavities so as to frictionally wedge the side wall portions of said support members against the side wall portions of the respective socket cavities, said plurality of elongated support members being positioned between and engaged with the respective upper and lower socket cavities associated with adjacent shelf members to connect said adjacent shelf members in spaced apart relationship one above the other.

2. The display unit defined in claim 1 wherein said plurality of upper socket cavities are positioned in opposed alignment with said plurality of lower socket cavities.

3. The display unit defined in claim 1 wherein each of said shelf members are substantially rectangular in shape, said plurality of upper and lower socket cavities being respectively positioned and located at approximately the respective corners of said shelf members.

4. The display unit defined in claim 1 including a socket cavity at the approximate center of the underside lower portion of each of said shelf members, said socket cavity being cooperatively engageable with at least one end portion of said support members.

5. The display unit defined in claim 1 wherein each of said socket cavities includes a plurality of projection members positioned and arranged in spaced apart relationship adjacent the side wall portions thereof defining a segmented channel space between said plurality of projection members and said cavity side wall portions, the opposed end portions of each of said plurality of support members having a cross-sectional shape adaptable to be cooperatively received within said segmented channel space.

6. The display unit defined in claim 1 including a side panel display unit attachable to said display unit, said side panel unit including a backing member having at least one shelf member associated therewith, and means for removably attaching said side panel unit to said display unit by and between two of said support members.

7. The display unit defined in claim 1 including a cap member, said cap member being cooperatively engageable with either end portion of said plurality of support members and with said plurality of upper socket cavities.

8. The display unit defined in claim 1 including connector means for joining two of said shelf members in side-by-side relationship to each other, said connector means having opposed end portions and including a pair of socket means associated with one end portion thereof and a single socket means associated with the opposite end portion thereof, each of said pair of connector socket means being correspondingly shaped and dimensioned so as to be insertably receiveable within any one of said plurality of socket cavities associated with the upper and lower portions of each of said shelf members, said single connector socket means having a cavity associated therewith correspondingly shaped and dimensioned to telescopingly receive the opposed end portions of each of said elongated support members.

9. The display unit defined in claim 1 including rolling means positioned at spaced locations to support said display unit for movement on a support surface.

10. A display unit for accommodating the storage of products thereon comprising a plurality of substantially similar shelf members each having an upper and lower portion and a floor portion extending therebetween for positioning products thereon, a plurality of elongated support members having opposed end portions a plurality of socket means formed integral with the upper portion of each of said shelf members and a plurality of socket means formed integral with the lower portion of each of said shelf members, said plurality of upper and lower socket means being positioned at spaced locations on the respective upper and lower portions of said shelf members, connector means for joining at least two of said shelf members in side-by-side relationship one adjacent the other in the same horizontal plane, said connector means including a member having a pair of socket means associated with one end portion thereof, each of said pair of connector socket means being cooperatively engageable with any one of said plurality of socket means associated with the upper and lower portions of each of said shelf members, said connector means being positioned and arranged with respect to at least two adjacent shelf members such that one of said pair of connector socket means engages one of the socket means associated with one of said shelf members and the other of said pair of connector socket means engages one of the socket means associated with the other of said shelf members.

11. The display unit defined in claim 10 wherein said connector member includes additional socket means, said additional socket means including means cooperatively engageable with at least one of the opposed end portions of each of said elongated support members.

12. The display unit defined in claim 11 wherein said additional connector socket means includes a single connector portion.

13. A display unit for accommodating the storage of products thereon comprising a plurality of substantially similar shelf members each having an upper and lower portion and a floor portion extending therebetween for positioning products thereon, a plurality of elongated support members having opposed end portions, a plurality of socket means formed integral with the upper portion of each of said shelf members and a plurality of socket means formed integral with the lower portion of each of said shelf members, said plurality of upper and lower socket means being positioned at spaced locations on the respective upper and lower portions of said shelf members, each of said socket means being cooperatively engageable with the opposed end portions of said elongated support members for supporting said support members in a substantially upright position relative to the floor portion associated with each of said shelf members, connector means for joining two of said shelf members in side-by-side relationship one adjacent the other, said connector means having opposed end portions and including a pair of socket means associated with open end portion thereof and a single socket means associated with the opposite end portion thereof, each of said pair of connector socket means being cooperatively receiveable within any one of said plurality of socket means associated with the upper and lower portions of each of said shelf members, said single connector socket means being correspondingly shaped and dimensioned so as to cooperatively receive one of the opposed end portions of each of said elongated support members, said plurality of elongated support members and said connector means being positioned and arranged so as to engage at least some of the upper and lower socket means associated with at least two shelf members to permit said shelf members to be vertically stackably arranged in spaced apart relationship one above the other and to be alternatively arranged in side-by-side horizontal relationship one adjacent the other.

14. The display unit defined in claim 13 wherein the single connector socket means associated with one end portion of said connector means is formed integral with at least one of the opposed end portions of at least some of said elongated support members.

15. The display unit defined in claim 13 wherein each of said shelf members are substantially rectangular in shape, said plurality of upper and lower socket means being respectively positioned and located at approximately the respective corners of each shelf member.

16. The display unit defined in claim 13 including a side panel display member attachable to said display unit, said side panel member including a backing member having at least one shelf member associated therewith, and means for removably attaching said side panel member to said display unit by and between at least two of said elongated support members.

17. The display unit defined in claim 13 including a cap member, said cap member being cooperatively engageable with either end portion of said plurality of support members and with said plurality of upper socket means.

18. The display unit defined in claim 13 including rolling means positioned at spaced locations to support said display unit for movement on a support surface.

19. In a display unit having a plurality of shelf display areas vertically stackable arranged in spaced apart relationship one above the other, and a plurality of substantially upright support means connecting vertically spaced pairs of side shelf display areas, the improvement comprising a portable side panel display unit attachable to said display unit, said side panel unit including a substantially planar backing member having at least one shelf member associated therewith, said backing member being dimensioned so as to extend by and between at least two of said substantially upright support means, and attachment means for removably attaching said entire side panel unit to said substantially upright support means.

20. The improvement defined in claim 19 wherein said shelf members includes a pair of opposed side portions, a rear portion, and a floor portion extending therebetween, said floor portion having upper and lower surfaces, said upper floor surface being oriented at an acute angle relative to the plane of said rear shelf portion.

21. The improvement defined in claim 14 wherein said backing member and said at least one shelf member are integrally formed into a one-piece construction.

22. The improvement defined in claim 19 wherein said attachment means includes a plurality of apertures positioned at spaced locations on said backing member so as to register with a plurality of corresponding apertures located on said support means, and fastener means insertably receivable through said plurality of apertures for removably attaching said side panel unit to said support means.

23. A display unit for accommodating the storage of products thereon comprising a plurality of substantially similar shelf members each having an upper and lower portion and a floor portion extending therebetween for positioning products thereon, a plurality of elongated support members having opposed end portions, a plurality of socket cavities integrally formed with the upper portions of each of said shelf members and a plurality of socket cavities integrally formed with the lower portion of each of said shelf members, said plurality of upper and lower socket cavities being positioned at spaced locations on the respective upper and lower portions of said shelf members, each of said socket cavities being cooperatively engageable with the opposed end portions of said support members for supporting said members in a substantially upright position relative to said floor portion, a connector member for joining two of said shelf members in side-by-side relationship to each other, said connector member having opposed end portions and including a pair of socket means associated with one end portion thereof and a single socket means associated with the opposite end portion thereof, each of said pair of connector socket means being correspondingly shaped and dimensioned so as to be insertably receiveable within any one of said plurality of socket cavities associated with the upper and lower portions of each of said shelf members, said single connector socket means having a cavity associated therewith correspondingly shaped and dimensioned to cooperatively receive the opposed end portions of each of said elongated support members, said plurality of elongated support members and said connector member being positioned and arranged so as to engage at least some of the upper and lower socket cavities associated with at leat two shelf members to permit said shelf members to be vertically stackably arranged in spaced apart relationship one above the other and to be alternatively arranged in side-by-side horizontal planar relationship one adjacent the other.

24. A display unit for accommodating the storage of products thereon comprising a plurality of substantially similar shelf members each having an upper and lower portion and a floor portion extending therebetween for positioning products thereon, a plurality of elongated support members having opposed end portions, a plurality of socket means associated with the upper and lower portions of each of said shelf members, said plurality of upper and lower socket means being positioned at spaced locations on the respective upper and lower portions of said shelf members, each of said socket means being cooperatively engageable with the opposed end portions of said elongated support member for supporting said support members in a substantially upright position relative to the floor portion associated with each of said shelf members, connector means associated with at least one end portion of at least some of said elongated support members for joining two of said shelf members in side-by-side relationship one adjacent the other, said connector means including a pair of socket means, each of said pair of connector socket means being cooperatively engageable with any one of said plurality of socket means associated with the upper and lower portions of each of said shelf members, said connector means being positioned and arranged with respect to at least two adjacent shelf members such that one of said pair of connector socket means engages one of the socket means associated with one of said shelf members and the other of said pair of connector socket means engages one of the socket means associated with the other of said shelf members.

* * * * *

UNITED STATES PATENT AND TRADEMARK OFFICE
CERTIFICATE OF CORRECTION

PATENT NO. : 4,930,643

DATED : June 5, 1990

INVENTOR(S) : Paul L. Flum

It is certified that error appears in the above-identified patent and that said Letters Patent is hereby corrected as shown below:

Column 12, line 68, "sam" should be --same--.

Column 13, line 36, "pane" should be --panel--.

Column 17, line 4, "members" should be --member--.

Column 18, line 9, "leat" should be --least--.

Signed and Sealed this

Twenty-third Day of July, 1991

*Attest:*

HARRY F. MANBECK, JR.

*Attesting Officer*   *Commissioner of Patents and Trademarks*